(12) United States Patent
Tolksdorf et al.

(10) Patent No.: US 11,005,329 B2
(45) Date of Patent: May 11, 2021

(54) ELECTRIC MOTOR WITH ROTATING FIRST CONCENTRIC COOLING FINS AND SECOND CONCENTRIC FINS ON THE HOUSING

(71) Applicant: Lenze Drives GmbH, Extertal (DE)

(72) Inventors: Andreas Tolksdorf, Hameln (DE); Karsten Huebner, Aerzen (DE); Holger Hennig, Hameln (DE)

(73) Assignee: Lenze Drives GmbH, Extertal (DE)

( * ) Notice: Subject to any disclaimer, the term of this patent is extended or adjusted under 35 U.S.C. 154(b) by 153 days.

(21) Appl. No.: 15/768,289

(22) PCT Filed: Oct. 11, 2016

(86) PCT No.: PCT/EP2016/074378
§ 371 (c)(1),
(2) Date: Apr. 13, 2018

(87) PCT Pub. No.: WO2017/064081
PCT Pub. Date: Apr. 20, 2017

(65) Prior Publication Data
US 2018/0309343 A1    Oct. 25, 2018

(30) Foreign Application Priority Data

Oct. 14, 2015 (DE) .................... 10 2015 219 951.7

(51) Int. Cl.
*H02K 5/18* (2006.01)
*H02K 9/22* (2006.01)
(Continued)

(52) U.S. Cl.
CPC ................. *H02K 5/18* (2013.01); *H02K 9/06* (2013.01); *H02K 9/08* (2013.01); *H02K 9/14* (2013.01);
(Continued)

(58) Field of Classification Search
CPC .. H02K 5/18; H02K 5/20; H02K 9/00; H02K 9/02; H02K 9/04; H02K 9/06; H02K 9/14;
(Continued)

(56) References Cited

U.S. PATENT DOCUMENTS 2,909,682 A * 10/1959 Erickson .................. H02K 9/08
                                                       310/64
3,271,601 A *  9/1966 Raver ..................... H02J 7/243
                                                      310/68 R
(Continued)

FOREIGN PATENT DOCUMENTS

CH      545 552 A    1/1974
CN   203180720 U    9/2013
(Continued)

OTHER PUBLICATIONS

WO-2012007194-A2 English Translation.*
(Continued)

*Primary Examiner* — Maged M Almawri
(74) *Attorney, Agent, or Firm* — Crowell & Moring LLP

(57) ABSTRACT

An electric motor with a heat source is arranged on a shaft in a co-rotating manner, wherein a first and a second cooling fin arrangement interact in order to dissipate heat from the heat source to the outside.

13 Claims, 3 Drawing Sheets

(51) Int. Cl.
  *H02K 9/14* (2006.01)
  *H02K 9/08* (2006.01)
  *H02K 9/18* (2006.01)
  *H02K 11/33* (2016.01)
  *H02K 11/35* (2016.01)
  *H02K 9/06* (2006.01)

(52) U.S. Cl.
  CPC ............ *H02K 9/18* (2013.01); *H02K 9/22* (2013.01); *H02K 11/33* (2016.01); *H02K 11/35* (2016.01); *H02K 2211/03* (2013.01)

(58) Field of Classification Search
  CPC ........ H02K 9/16; H02K 9/22; H02K 2211/03; H20K 11/33; H20K 11/35
  USPC ................................................ 310/52–64, 66
  See application file for complete search history.

(56) References Cited

U.S. PATENT DOCUMENTS

| | | | | | |
|---|---|---|---|---|---|
| 3,324,383 | A | * | 6/1967 | Raver | H02K 11/046 |
| | | | | | 322/73 |
| 3,353,042 | A | * | 11/1967 | Baumann | H02K 9/14 |
| | | | | | 310/57 |
| 4,144,932 | A | * | 3/1979 | Voigt | H02K 11/042 |
| | | | | | 165/122 |
| 5,744,880 | A | * | 4/1998 | Kudoh | B60L 50/52 |
| | | | | | 310/58 |
| 6,025,665 | A | * | 2/2000 | Poag | H02K 1/278 |
| | | | | | 310/68 B |
| 6,351,044 | B1 | * | 2/2002 | Miyahara | F04D 25/0653 |
| | | | | | 257/E23.099 |
| 6,621,186 | B2 | * | 9/2003 | Kawamura | H02K 9/06 |
| | | | | | 310/60 R |
| 7,102,267 | B2 | * | 9/2006 | Gromoll | H02K 9/14 |
| | | | | | 310/260 |
| 8,080,909 | B2 | * | 12/2011 | Perkins | B60K 6/48 |
| | | | | | 310/64 |
| 8,198,770 | B2 | * | 6/2012 | Hassett | F16C 37/00 |
| | | | | | 310/90 |
| 9,088,198 | B2 | * | 7/2015 | Tang | H02K 11/33 |
| 9,638,256 | B2 | * | 5/2017 | Duffy | F02C 7/06 |
| 9,780,619 | B2 | * | 10/2017 | Fujimoto | B62D 5/046 |
| 10,112,231 | B2 | * | 10/2018 | Handwerker | B21J 5/063 |
| 10,250,106 | B2 | * | 4/2019 | Senoo | H02K 5/20 |
| 2002/0047343 | A1 | * | 4/2002 | Kawamura | H02K 9/06 |
| | | | | | 310/60 R |
| 2005/0194847 | A1 | * | 9/2005 | Gromoll | H02K 9/14 |
| | | | | | 310/54 |
| 2008/0277094 | A1 | * | 11/2008 | Peng | F04D 25/0653 |
| | | | | | 165/80.3 |
| 2010/0303652 | A1 | * | 12/2010 | Peng | H02K 21/24 |
| | | | | | 417/423.1 |
| 2013/0342052 | A1 | * | 12/2013 | Turnbull | H02K 9/22 |
| | | | | | 310/64 |
| 2016/0072359 | A1 | * | 3/2016 | Kreidler | H02K 5/22 |
| | | | | | 310/68 D |
| 2016/0105084 | A1 | * | 4/2016 | Ishimaru | H02K 11/215 |
| | | | | | 310/54 |
| 2016/0172936 | A1 | * | 6/2016 | Schueler | H02K 9/06 |
| | | | | | 310/60 R |
| 2017/0264171 | A1 | * | 9/2017 | Williams | H02K 11/27 |
| 2018/0288907 | A1 | * | 10/2018 | Richards | H05K 7/20927 |
| 2018/0301959 | A1 | * | 10/2018 | Wettlaufer | H02K 1/14 |
| 2019/0058374 | A1 | * | 2/2019 | Enomoto | F28D 15/02 |
| 2019/0101132 | A1 | * | 4/2019 | Fujiwara | A47L 9/2889 |
| 2019/0113045 | A1 | * | 4/2019 | Diehl | H02K 5/20 |
| 2019/0178261 | A1 | * | 6/2019 | Kajikawa | H02K 5/20 |
| 2019/0273416 | A1 | * | 9/2019 | Kizu | H02K 3/38 |
| 2019/0280566 | A1 | * | 9/2019 | Hattori | H02K 5/26 |

FOREIGN PATENT DOCUMENTS

| | | | |
|---|---|---|---|
| CN | 204538932 U | 8/2015 | |
| CN | 204669169 U | 9/2015 | |
| DE | 1 413 831 | 10/1968 | |
| DE | 2 312 334 | 9/1974 | |
| DE | 102 44 428 A1 | 6/2004 | |
| DE | 601 10 009 T2 | 3/2006 | |
| DE | 10 2013 211 361 A1 | 12/2013 | |
| DE | 10 2015 216 406 A1 | 3/2016 | |
| EP | 1 137 154 A1 | 9/2001 | |
| EP | 1 193 837 A2 | 4/2002 | |
| WO | WO-2012007194 A2 * | 1/2012 | ............ F03D 7/0224 |

OTHER PUBLICATIONS

German-language European Office Action issued in counterpart European Application No. 16 779 126.8 dated Nov. 7, 2019 (six pages).

International Search Report (PCT/ISA/210) issued in PCT Application No. PCT/EP2016/074378 dated Dec. 1, 2016 with English translation (five pages).

German-language Written Opinion (PCT/ISA/237) issued in PCT Application No. PCT/EP2016/074378 dated Dec. 1, 2016 (six pages).

Chinese-language Office Action issued in Chinese Application No. 201680060151.3 dated Sep. 15, 2020 with English translation (10 pages).

* cited by examiner

ELECTRIC MOTOR WITH ROTATING FIRST CONCENTRIC COOLING FINS AND SECOND CONCENTRIC FINS ON THE HOUSING

BACKGROUND AND SUMMARY OF THE INVENTION

The invention relates to an electric motor which has a motor housing, a shaft which is rotatably mounted in the motor housing, and a heat source which is arranged on the shaft in a co-rotating manner.

A heat source of this kind which is arranged in a co-rotating manner may be an electronics system which is arranged in the electric motor in a co-rotating manner. The heat source typically generates heat loss which leads to an undesired increase in the motor temperature in the electric motor. In addition, heat from the heat source which is produced in any case can cause damage in the electric motor, in particular when said heat source is an electronics system.

It is conceivable to arrange a co-rotating electronics system on a motor shaft outside a motor housing in order to achieve a certain degree of thermal decoupling. However, this results in the problem that the electronics system has to be protected separately in order to realize protection, for example in accordance with one of the classes IP54 to IP56, which is common in commercially available electric motors. This requires additional expenditure.

One object of the invention is therefore to provide an electric motor which provides an effective cooling concept for heat sources which are arranged in a co-rotating manner.

According to the invention, this is achieved by an electric motor having a motor housing, a motor shaft which is rotatably mounted in the motor housing, and a heat source which is arranged on the motor shaft in a co-rotating manner. A first cooling fin arrangement is arranged on the motor shaft in a co-rotating manner and adjacent to the heat source, and a second cooling fin arrangement is arranged on the motor housing such that it points inward. The first cooling fin arrangement and the second cooling fin arrangement engage for the purpose of dissipating heat from the heat source out of the motor housing.

The invention relates to an electric motor. The electric motor has a motor housing and also a shaft which is rotatably mounted in the motor housing. The electric motor further has a heat source which is arranged on the shaft in a co-rotating manner.

According to the invention, the electric motor has a first cooling fin arrangement which is arranged on the shaft in a co-rotating manner and adjacent to the heat source, and also a second cooling fin arrangement which is arranged on the motor housing so as to point inward or in the direction of the first cooling fin arrangement. The first cooling fin arrangement and the second cooling fin arrangement interengage for the purpose of dissipating heat from the heat source out of the motor housing.

By means of the electric motor according to the invention, heat can be dissipated from the inside to the outside by interengaging cooling fins, so that the heat source can be arranged within the motor housing.

It is understood that the electric motor may also be, in principle, a generator.

The motor housing can be, in particular, water-tight, dust-tight or sealed against other influences. In this respect, said motor housing can comply with, in particular, a desired IP protection class.

The heat source can be, in particular, an electrical or electronic circuit, for example a power electronics system for open-loop/closed-loop control of the electric motor. An electronic circuit of this kind can be arranged within the electric motor or the motor housing in order to drive, for example, rotor coils, which are coupled to the motor shaft in a rotationally fixed manner, with wiring paths which are as short as possible.

The first cooling fin arrangement can have a number of concentrically arranged, circular cooling fins. Said cooling fins can fulfill the rotary movement of the shaft.

The second cooling fin arrangement can accordingly have a number of concentrically arranged, circular cooling fins.

Owing to the formation of circular cooling fins both on the first cooling fin arrangement and also on the second cooling fin arrangement, an interengaging configuration can advantageously be achieved taking into account the relative rotary movement. Distances between the cooling fins can be minimized in this way in order to allow particularly advantageous transportation of heat.

The cooling fins of the first cooling fin arrangement are preferably arranged radially offset in relation to the cooling fins of the second cooling fin arrangement with respect to the motor shaft. This prevents contact between the cooling fins and therefore damage.

The second cooling fin arrangement can, in particular, constitute an end plate (A or B end plate) of the electric motor or be integrated in an end plate. Since another device typically does not directly adjoin an end plate of this kind, the heat can be dissipated particularly effectively. The end plate can, in particular, also ensure the abovementioned protection.

According to one embodiment, a third cooling fin arrangement with a number of outwardly pointing cooling fins for dissipating heat which is absorbed by the second cooling fin arrangement is arranged on the outside in relation to the second cooling fin arrangement. This allows advantageous discharge of the heat to the outside.

A fan can be arranged on the motor shaft outside the motor housing, said fan being designed to generate an air flow past a surface section of the motor housing, which surface section is located on the outside of the second cooling fin arrangement, when the motor shaft rotates. This allows heat to be transported away in an improved manner, wherein the generated air flow can be directed, in particular, onto or through the third cooling fin arrangement.

The electric motor can further have a shielding part which, in a co-rotating manner with the shaft, is arranged on the heat source and serves to thermally shield the heat source from other parts of the electric motor, in particular from electrical windings. The shielding part can, for example, also be in the form of a shielding housing. In this way, improved thermal decoupling can be achieved in particular, this protecting the heat source against overheating.

The shielding part can be designed to press the heat source against the first cooling fin arrangement. A control electronics system, which can contain elements for wireless data communication with remote data communication stations which are fastened to other static elements of the motor, can be fastened to or in the shielding part, for example as a heat source. The shielding part can also have a circumferential sealing contour.

Electrical supply lines to the shielding part or to the heat source can be arranged in the shielding part. This allows simple manufacture.

The shielding part can be produced from plastic. This improves thermal shielding.

The shielding part can have a number of vanes for moving ambient air. This improves the transmission of heat. The shielding part can also accommodate elements for data communication with a remote station which is fastened to other—however static—parts of the motor.

The first cooling fin arrangement can have a number of vanes for moving ambient air. The air can also be advantageously moved in this way in order to improve the transmission of heat.

The first, second and/or third cooling fin arrangement and/or the motor housing can be composed of a metal, in particular of aluminum. In particular, a stable construction and good thermal conductivity are achieved in this way.

The conduction of heat can be achieved, in particular, by convection in air. However, it is understood that all heat conduction mechanisms, in particular even transmission by thermal radiation, can be considered in principle.

The heat source or the power electronics system can be fastened on a co-rotating heat sink such that they are effectively thermally connected.

It is understood that, owing to the configuration according to the invention, it is possible to minimize the number of mechanical components because of the multifunctional shielding part. In addition to shielding the heat from the electric motor, it is also possible, for example, for power semiconductors to be pressed, the control circuit board to be mechanically fastened and the contacts for electrical connection to the rotor to be guided, in particular by the shielding part.

An electronics system, including heat sink and shielding part, can be manufactured completely separately.

The electronics system or the heat source in general can be fastened on the rotor, before said rotor is inserted into the stator.

Owing to the cited measures, the electrical connections which are to be established are readily accessible.

In particular, there is also a cost advantage over solutions which are installed on the outside of the electric motor, wherein requisite housing parts which are separately sealed off are minimized.

BRIEF DESCRIPTION OF THE DRAWINGS

The invention will be described in more detail below with reference to the drawings, in which.

DETAILED DESCRIPTION OF THE DRAWINGS

Figure 1:
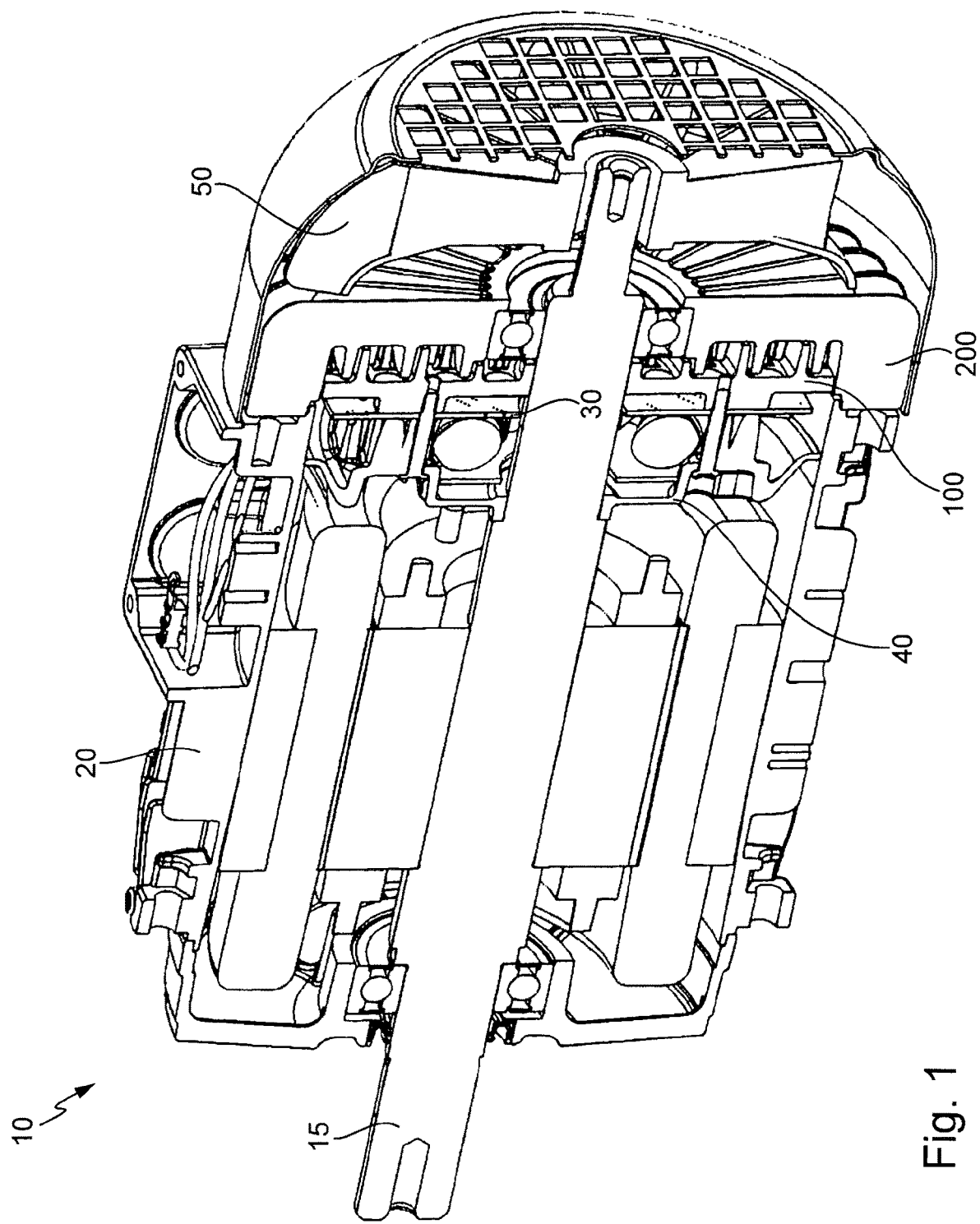
FIG. 1: shows a sectional view through an electric motor.

FIG. 1 shows an electric motor 10 according to the invention. The electric motor 10 has a shaft 15 which can be set in rotary motion by means of the electric motor 10 and which is designed to drive components which are situated outside the electric motor 10.

The electric motor 10 has a surrounding motor housing 20 in which conventional components which serve to set the shaft 15 in rotation are contained. Said components are, for example, coils, corresponding supply lines etc. Reference is also made to the relevant technical literature in this respect.

A circuit board 30 is arranged on the shaft 15 in a co-rotating manner. Amongst other things, power semiconductors which serve to drive rotor coils of the electric motor 10 and generate heat loss during operation are arranged on the circuit board 30.

In FIG. 1, a shielding part 40 which is composed of plastic is arranged to the left-hand side of the circuit board 30, said shielding part at least partially thermally decoupling the circuit board 30 from components, in particular rotor coils, which are arranged to the left-hand side of the shielding part 40.

On account of the above-described development of heat on the circuit board 30, the circuit board 30 can also be referred to as a heat source. A first cooling fin arrangement 100 and a second cooling fin arrangement 200 are provided in order to dissipate the produced heat to the outside as effectively as possible. Said first cooling fin arrangement and second cooling fin arrangement interengage, this being illustrated and described in greater detail below with reference to the further figures.

A fan 50 is arranged on the motor shaft 15 to the right-hand side of the cooling fin arrangements 100, 200, said fan co-rotating with the motor shaft 15 and blowing air to the left. The air flow which is generated in this way serves for cooling purposes, wherein said air flow is conducted, in particular, directly to the second cooling fin arrangement 200 and therefore dissipates heat arising there or heat arriving there to the surrounding area and ensures ventilation.

It should be mentioned that the second cooling fin arrangement 200 also constitutes a B end plate of the electric motor 10 in the present case. This allows advantageous integration and saving of installation space.

Figure 2:
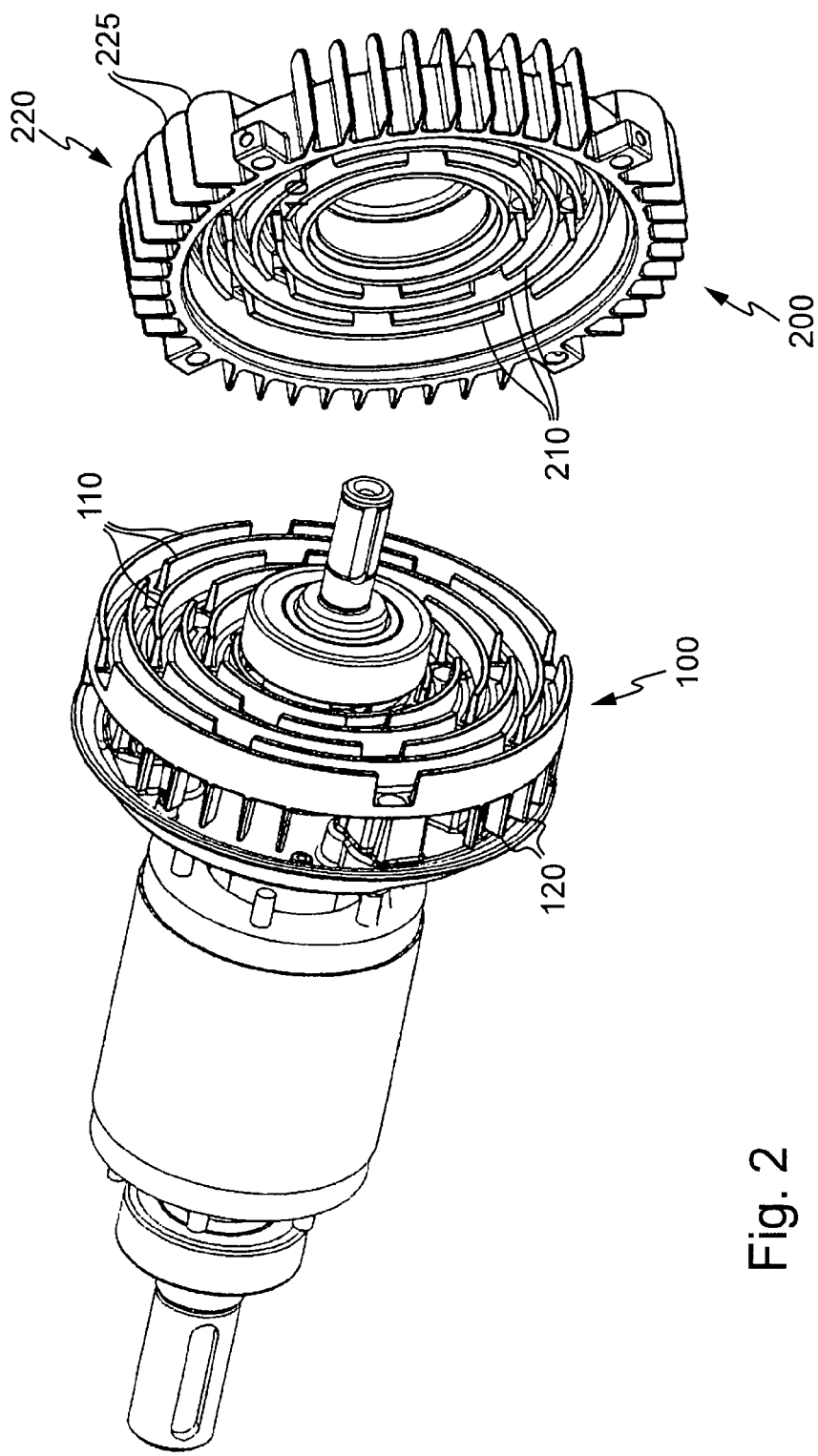
FIG. 2: shows a first cooling fin arrangement and a second cooling fin arrangement.

FIG. 2 shows the first cooling fin arrangement 100 and the second cooling fin arrangement 200 in greater detail. It can be seen in said figure that the first cooling fin arrangement 100 has a number of cooling fins 110 which are in the form of a segment of an arc of a circle and are arranged concentrically in relation to one another. Free space in which—as will be described in detail further below—a number of corresponding cooling fins 210 of the second cooling fin arrangement 200 can engage is respectively present between said cooling fins 110.

The circuit board 30 is arranged directly adjacent to the first cooling fin arrangement 100 and is pressed by the shielding part 40 in the direction of the first cooling fin arrangement 100. Particularly advantageous discharge of heat, which is produced in or on the circuit board 30, to the first cooling fin arrangement 100 is achieved in this way. This heat can then be dissipated further to the outside by means of the cooling fins 110 of the first cooling fin arrangement 100, as will be described in more detail further below.

A number of vanes 120 which surround the circuit board 30 are fitted laterally to the first cooling fin arrangement 100. The vanes 120 serve to ensure a certain movement of the air which is located in the electric motor 10. An improved cooling effect, in particular of the circuit board 30, can also be achieved in this way.

In order to achieve this movement of air, the first cooling fin arrangement 100 is mounted directly on the shaft 15, so that the first cooling fin arrangement 100 also co-rotates with the shaft 15. This allows movement of the circuit board 30 and of the first cooling fin arrangement 100 at an identical angular velocity. In addition, as just mentioned, air is moved by means of the vanes 120 in order to assist cooling.

It can further be seen in FIG. 2 that the second cooling fins 210, which are each designed in the form of a segment of an arc of a circle or in the form of an arc of a circle and are arranged concentrically in relation to one another, are arranged on the inside of the second cooling fin arrangement 200. The cooling fins 210 of the second cooling fin arrangement 200 can therefore engage into the intermediate spaces, already mentioned further above, between the cooling fins 110 of the first cooling fin arrangement 100. This allows particularly advantageous interaction between the cooling fins 110, 210, as will be described in more detail further below with reference to FIG. 3.

Furthermore, a third cooling fin arrangement 220 with a number of cooling fins 225 which point radially outward is formed on the outside in relation to the second cooling fin arrangement 200, wherein the second and the third cooling fin arrangement are integrally formed. The third cooling fin arrangement 220 can, in particular, dissipate heat which is absorbed by the cooling fins 210 of the second cooling fin arrangement 200 to the outside. The air which is generated by the fan 50, already mentioned further above, in particular also flows through the third cooling fin arrangement 220. This allows particularly advantageous dissipation of heat overall.

Figure 3:
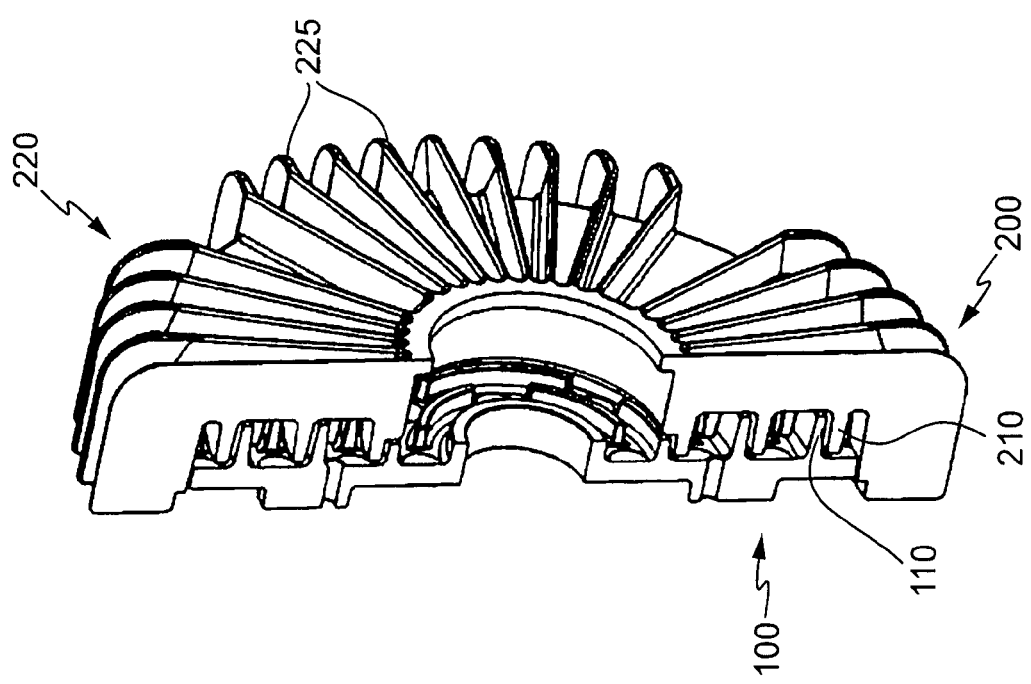
FIG. 3: shows interaction between the first and the second cooling fin arrangement.

FIG. 3 shows the interaction between the first and the second cooling fin arrangement 100, 200. It can be seen in said figure, in particular, that the cooling fins 110, 210 of the two cooling fin arrangements 100, 200 interengage, so that a large surface along which the cooling fins 110, 210 are situated directly opposite one another is achieved overall. This allows particularly effective transportation of heat, without the cooling fins 110, 210 also coming into contact in the event of rotary movement. The cooling fins 110 of the first cooling fin arrangement 100 can move freely in intermediate spaces between the cooling fins 210 of the second cooling fin arrangement 200, wherein this approach can also be reversed in respect of the relative movement.

Therefore, advantageous discharge of heat from the circuit board 30, via the first cooling fin arrangement 100, to the second cooling fin arrangement 200 and from said second cooling fin arrangement onward to the third cooling fin arrangement 220 is achieved overall, wherein the heat can be dissipated to the outside out of the third cooling fin arrangement 220, specifically in particular by means of the air flow already mentioned further above which is generated by the fan 50. At the same time, the circuit board 30 is shielded against further heat-generating components of the electric motor 10 by the shielding part 40.

It should further be mentioned that the abovementioned motor housing 20 provides routine protection against dust and moisture overall, this also being true of the circuit board 30. Therefore, separate encapsulation of the circuit board 30 in order to achieve a specific protection class can be dispensed with. This allows simple and compact construction.

What is claimed is:

1. An electric motor, comprising:
a motor housing;
a motor shaft which is rotatably mounted in the motor housing;
a heat source which is arranged on the motor shaft in a co-rotating manner,
a first cooling fin arrangement which is arranged on the motor shaft in a co-rotating manner and adjacent to the heat source; and
a second cooling fin arrangement which is arranged on the motor housing such that it points inward,
wherein the first cooling fin arrangement and the second cooling fin arrangement engage for the purpose of dissipating heat from the heat source out of the motor housing, and
the heat source is a power electronics system for open-loop/closed-loop control of the electric motor arranged axially between a rotor of the electric motor and the first cooling fin arrangement.

2. The electric motor as claimed in claim 1, wherein the heat source is an electrical or electronic circuit.

3. The electric motor as claimed claim 1, wherein the second cooling fin arrangement has a number of concentrically arranged, circular cooling fins.

4. The electric motor as claimed in claim 1, wherein the second cooling fin arrangement constitutes an end plate of the electric motor.

5. The electric motor as claimed in claim 1, further comprising:
a third cooling fin arrangement with a number of outwardly pointing cooling fins for dissipating heat which is absorbed by the second cooling fin arrangement, is arranged on the outside in relation to the second cooling fin arrangement.

6. The electric motor as claimed in claim 1, further comprising:
a fan arranged on the motor shaft outside the motor housing, said fan being designed to generate an air flow past a surface section of the motor housing, which surface section is located on the outside of the second cooling fin arrangement, when the motor shaft rotates.

7. The electric motor as claimed claim 1, wherein the first cooling fin arrangement has a number of concentrically arranged, circular cooling fins.

8. The electric motor as claimed claim 7, wherein the second cooling fin arrangement has a number of concentrically arranged, circular cooling fins.

9. The electric motor as claimed in claim 8, wherein the cooling fins of the first cooling fin arrangement are arranged radially offset in relation to the cooling fins of the second cooling fin arrangement with respect to the motor shaft.

10. The electric motor as claimed in claim 1, further comprising:
a shielding part which, in a co-rotating manner with the motor shaft, is arranged on the heat source for thermally shielding the heat source from other parts of the electric motor.

11. The electric motor as claimed in claim 10, wherein the shielding part is designed to press the heat source against the first cooling fin arrangement, and/or
a control electronics system is fastened to or in the shielding part, and/or
the shielding part has a circumferential sealing contour.

12. The electric motor as claimed in claim 11, wherein the shielding part has a number of vanes for moving ambient air, and/or
the first cooling fin arrangement has a number of vanes for moving ambient air.

13. The electric motor as claimed in claim 10, wherein the shielding part has a number of vanes for moving ambient air, and/or
the first cooling fin arrangement has a number of vanes for moving ambient air.

* * * * *